United States Patent
Yamaguchi et al.

(10) Patent No.: US 7,259,819 B2
(45) Date of Patent: Aug. 21, 2007

(54) LIQUID CRYSTAL DISPLAY DEVICE WITH A BRIDGE WIRING MEMBER WITH AN ELECTRIC FIELD WEAKER THAN THAT CREATED IN MINUTE DOMAINS ABOVE THE PIXEL ELECTRODE

(75) Inventors: Takeshi Yamaguchi, Kumagaya (JP); Kisako Ninomiya, Fukaya (JP); Yasushi Kawata, Ageo (JP); Yuzo Hisatake, Yokohama (JP); Natsuko Fujiyama, Okazaki (JP); Akio Murayama, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 10/756,496

(22) Filed: Jan. 14, 2004

(65) Prior Publication Data

US 2004/0207788 A1    Oct. 21, 2004

(30) Foreign Application Priority Data

Jan. 15, 2003    (JP)    ............................ 2003-006980

(51) Int. Cl.
    *G02F 1/1337*    (2006.01)
(52) U.S. Cl. ...................... 349/130; 349/129; 349/146; 349/143
(58) Field of Classification Search ................ 349/106, 349/156, 110, 139, 129
    See application file for complete search history.

(56) References Cited

U.S. PATENT DOCUMENTS 6,100,953 A * 8/2000 Kim et al. .................. 349/129
6,671,025 B1 * 12/2003 Ikeda et al. ................. 349/156
2001/0022643 A1 * 9/2001 Kim et al. ................... 349/139
2001/0024257 A1 * 9/2001 Kubo et al. ................. 349/138
2002/0075437 A1 * 6/2002 Fukumoto et al. .......... 349/129
2004/0207788 A1   10/2004 Yamaguchi et al.

FOREIGN PATENT DOCUMENTS

JP        2002-169159         6/2002

OTHER PUBLICATIONS

U.S. Appl. No. 11/464,937, filed Aug. 16, 2006, Ninomiya et al.
U.S. Appl. No. 11/466,230, filed Aug. 22, 2006, Yamaguchi et al.

* cited by examiner

*Primary Examiner*—Andrew Schechter
*Assistant Examiner*—Lucy Chien
(74) *Attorney, Agent, or Firm*—Oblon, Spivak, McClelland, Maier & Neustadt, P.C.

(57)    ABSTRACT

A liquid crystal display device includes an array substrate having a pixel electrode formed of a conductor, a counter substrate having a counter electrode facing the pixel electrode, and a liquid crystal layer held between the substrates and containing liquid crystal molecules set in a vertical alignment with respect to the substrates. The pixel electrode had a void space located in the conductor to provide minute domains between which different directors of the liquid crystal molecules are obtained when a potential difference is applied between the array and counter electrodes, and a bridge-wiring member interconnecting adjacent parts of the conductor in the void space, and the bride-wiring member is configured to make an electric field created in a part of the pixel area located on the bridge-wiring member weaker than that created in the minutes domains according to the potential difference.

10 Claims, 5 Drawing Sheets

LIQUID CRYSTAL DISPLAY DEVICE WITH A BRIDGE WIRING MEMBER WITH AN ELECTRIC FIELD WEAKER THAN THAT CREATED IN MINUTE DOMAINS ABOVE THE PIXEL ELECTRODE

CROSS-REFERENCE TO RELATED APPLICATIONS

This application is based upon and claims the benefit of priority from the prior Japanese Patent Application No. 2003-006980, filed Jan. 15, 2003, the entire contents of which are incorporated herein by reference.

BACKGROUND OF THE INVENTION

1. Field of the Invention

This invention relates to a liquid crystal display device wherein a liquid crystal layer is held between a pair of electrode substrates and more particularly to a liquid crystal display device whose a liquid crystal layer is divided into a plurality of domains between which liquid crystal molecules are set in different tilt directions.

2. Description of the Related Art

Liquid crystal display devices are applied in various fields of OA equipments, information terminals, watches, televisions and the like because of their characteristics of lightness, thinness and low power consumption. Particularly, an active matrix type liquid crystal display panel has an excellent response characteristic obtained by thin film transistors (TFTs) for switching pixels. Thus, the active matrix type liquid crystal display panel is used as a monitor display for a portable TV or a computer, which is required to quickly display a large quantity of image information.

In recent years, with an increase in quantity of information, there is a demand for enhancement of the resolution and display speed of the liquid crystal display panel. As a technique of enhancing the resolution and display speed of the liquid crystal display panel, the number of increased by miniaturization of the TFT array structure. In this case, a liquid crystal display mode, which can provide a response speed of liquid crystal molecules twice to several tens of times higher than current level, is required to change the alignment of liquid crystal molecules in a period shortened according to the increase in the number of pixels. Such an liquid crystal display mode can be selected from Optically Compensated Birefringence (OCB), Vertically Aligned Nematic (VAN), Hybrid Aligned Nematic (HAN), and n-alignment modes using a nematic liquid crystal and Surface-Stabilized Ferroelectric Liquid Crystal (SSFLC) and Anti-Ferroelectric Liquid Crystal (AFLC) modes using a smectic liquid crystal, for example.

Particular attention has recently been paid to the VAN mode, which has a higher response speed than the conventional twisted nematic (TN) mode and adopts vertical alignment treatment, thus dispensing with a conventional rubbing process that may cause defects such as electrostatic destruction. Moreover, a design for viewing angle compensation becomes easier when the VAN mode is employed. The viewing angle can be enlarged by a multi-domain structure in which a liquid crystal layer of each pixel is divided into a plurality of domains between which liquid crystal molecules are set in different tilt directions.

When the multi-domain structure of the VAN mode is applied to pixels of the liquid crystal display device, the plurality of domains are created, for example, by distorting an electric field applied from each electrode to the liquid crystal layer, with a use of a slit formed inside the electrode or an insulating body formed periphery of the electrode, so that the tilt directions can be determined according to the dielectric constant anisotropy of a liquid crystal material and the distorted electric field.

Figure 13:
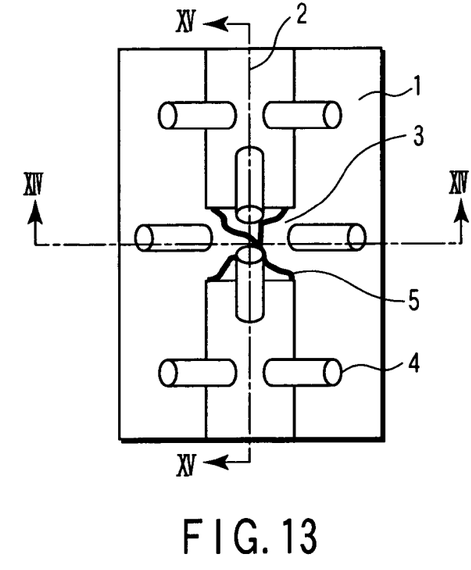
FIG. 13 is a view showing an example, in which a slit is formed to obtain a pixel of the multi-domain structure in the conventional liquid crystal display device.

FIG. 13 shows an example of the conventional liquid crystal display device in which a slit is formed to obtain a pixel with the multi-domain structure. A pixel electrode includes a plurality of electrode segments 1 which are separated by the slit 2 and set to the same potential by use of a bridge-wiring member 3. The bridge-wiring member 3 is integrally formed with the electrode segments 1 as a wiring which electrically connects the electrode segments 1 to each other on the same plane. Since the bridge-wiring member 3 is formed across a part of the slit 2, it causes an undesired distortion of the electric field defined in the liquid crystal layer by the slit 2. As a result, not only useful domains between which the tilt directions of liquid crystal molecules 4 depend on the slit 2 but also useless domains between which the tilt directions of the liquid crystal molecules 4 depend on the bridge-wiring member 3 may be caused by application of the electric field. When this is practically observed by use of a polarization microscope, a black line 5 which is called a schlieren texture is observed on the boundary between the above domains.

Figure 14:
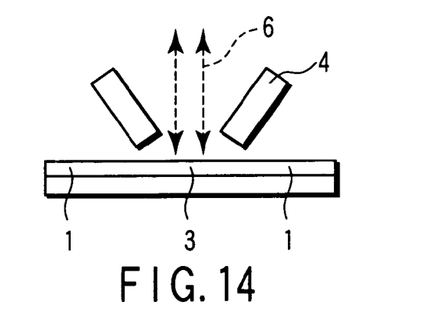
FIG. 14 is a view showing the cross section taken along the XIV-XIV line of FIG. 13, for illustrating the alignment state of liquid crystal molecules adjacent to both sides of the bridge-wiring member.
Figure 15:
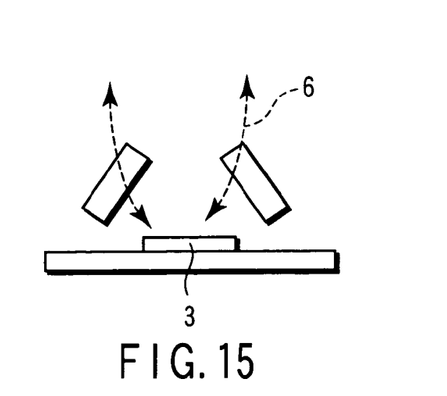
FIG. 15 is a view showing the cross section taken along the XV-XV line of FIG. 13, for illustrating the alignment state of liquid crystal molecules adjacent to both sides of the bridge-wiring member.

FIG. 14 shows the cross section taken along the XIV-XIV line of FIG. 13, for illustrating the alignment state of the liquid crystal molecules 4 adjacent to both ends of the bridge-wiring member 3. In this example, since electric flux lines 6 are not inclined as distortion of the electric field by the slit 2, the liquid crystal molecules 4 are aligned with those on the slit 2 side in two directions. FIG. 15 shows the cross section taken along the XV-XV line of FIG. 13, for illustrating the alignment state of the liquid crystal molecules 4 adjacent to both sides of the bridge-wiring member 3. In this example, the liquid crystal molecules 4 are influenced by the inclination of the electric flux lines 6, and are aligned in two directions that differ from those of FIG. 14. That is, the alignment of the liquid crystal molecules 4 is set in four directions within a local area including the bridge-wiring member 3.

Figure 16:
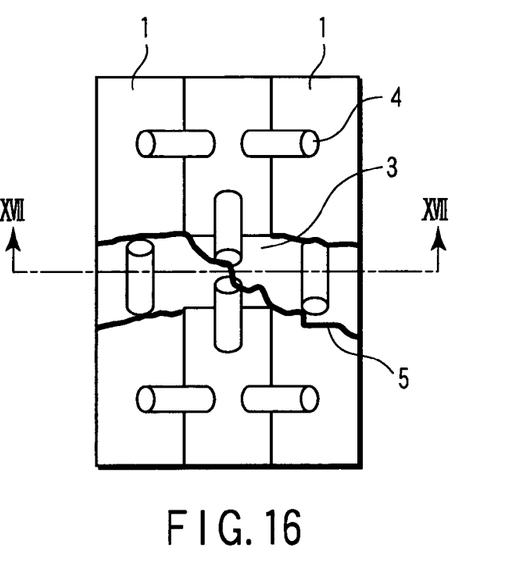
FIG. 16 is a view showing the alignment state of liquid crystal molecules made irregular by a mechanical shock from the state shown in FIG. 15.
Figure 17:
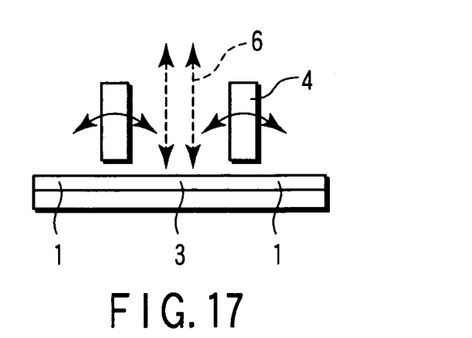
FIG. 17 is a view for illustrating that the liquid crystal molecules can be tilted in any direction as indicated in the alignment state shown in FIG. 16.

When a mechanical shock is given to the liquid crystal display device by depressing the display screen with a finger during an image display operation, an irregular alignment of the liquid crystal molecules 4 occurs as shown in FIG. 16. Since the electric flux lines 6 are not inclined in positions adjacent to the both ends of the bridge-wiring member 3 in the cross section taken along the XVII-XVII line of FIG. 16, the liquid crystal molecules 4 can be aligned in any direction as shown in FIG. 17 from the alignment state is shown in FIG. 14 by external force. If the irregular alignment of the liquid crystal molecules 4 occurs in practice as shown in FIG. 16, this causes a phenomenon that the domain depending on the bridge-wiring member 3 becomes larger, and at the same time, the domain depending on the slit 2 becomes smaller. As a result, the black line 5 of the schlieren texture becomes longer as shown in FIG. 16 and gives an influence to the transmittance and the influence is visually observed as display irregularity on the display screen. If the electric field is kept applied for image display, it takes a long time for the liquid crystal molecules to return to the original alignment state in which no irregularity occurs, with a movement of misalignment called disclination. As a result, the display irregularity will be present until the liquid crystal molecules 4 return to the original alignment state shown in FIG. 14.

Further, in the liquid crystal display device of the CPA (Continuous Pinwheel Alignment) mode, each pixel is divided into a plurality of sub-pixels and the alignment of the liquid crystal molecules are set in rotation symmetry about the midpoint of the sub-pixel. The electric field is applied to the liquid crystal layer from a plurality of sub-pixel electrode segments of, for example, a square form having high symmetry. Thus, the same problem occurs when a bridge-wiring member is provided as wirings that electrically connect the sub-pixel electrode segments to set them to the same potential without requiring a redundant wiring space.

BRIEF SUMMARY OF THE INVENTION

An object of this invention is to provide a liquid crystal display device which can solve the above problem and reduce display irregularity caused by application of a mechanical shock to enhance the display quality.

According to a first aspect of the present invention, a liquid crystal display device comprises a first substrate having a first electrode formed of a conductor, a second substrate having a second electrode arranged to face the first electrode, and a liquid crystal layer held between the first and second substrates and containing liquid crystal molecules which are set substantially in a vertical alignment with respect to the first and second substrates in a state where no potential difference exists between the first and second electrodes, wherein the first electrode has a void space located in the conductor as boundaries that divide a pixel area defined by an overlap of the first and second electrodes into minute domains between which different directors of the liquid crystal molecules are obtained when a potential difference is applied between the first and second electrodes, and a bridge-wiring member interconnecting adjacent parts of the conductor in the void space, and the bridge-wiring member is configured to make an electric field created in a part of the pixel area located on the bridge-wiring member weaker than that created in the minute domains when the potential difference is applied between the first and second electrodes.

According to a second aspect of the present invention, a liquid crystal display device comprises a first substrate having a first electrode formed of a conductor, a second substrate having a second electrode arranged to face the first electrode, and a liquid crystal layer held between the first and second substrates and containing liquid crystal molecules which are set substantially in a vertical alignment with respect to the first and second substrates in a state where no potential difference exists between the first and second electrodes, wherein the first electrode has conductor patterns of the conductor that creates, in a pixel area defined by an overlap of the first and second electrodes, minute domains between which substantially identical director patterns of the liquid crystal molecules are obtained when a potential difference is applied between the first and second electrodes, and a bridge-wiring member interconnecting the conductor patterns, and the bridge-wiring member is configured to make an electric field created in a part of the pixel area located on the bridge-wiring member weaker than that created in the minute domains when the potential difference is applied between the first and second electrodes.

In the above liquid crystal display devices, the bridge-wiring member is configured to make an electric field created in the part of the pixel area located on the bridge-wiring member weaker than an electric field created in the minute domains when the potential difference is applied between the first and second electrodes. As a result, the electric field on the bridge-wiring member can be made substantially equivalent to the electric field on the void space. Thus, the tilt directions (directors) of the liquid crystal molecules near the bridge-wiring member can be set equal to that near the void space. Since the electric fields on the bridge-wiring member and the void space are controlled to be equivalent distortion, the original state can be rapidly restored even if the alignment of the liquid crystal molecules is made irregular upon application of a mechanical shock.

Further, for example, the structure of the first substrate can be obtained by separating the bridge-wiring member further apart from the second electrode than the conductor in the first substrate, adding an insulating body having a smaller dielectric constant than the liquid crystal layer on the bridge-wiring member or using a combination of the above methods. In practice, the bridge-wiring member separated further apart from the second electrode than the conductor in the first substrate can be easily attained by, for example, forming an insulating layer on the first substrate as an underlying layer of the conductor and bridge-wiring member, and forming in the insulating material layer a concave portion that receives the bridge wiring portion to set the bridge-wiring member in position lower than the conductor.

Additional objects and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described an active matrix type liquid crystal display device according to a first embodiment of this invention with reference to the accompanying drawings. The liquid crystal display device is configured as a liquid crystal display panel 100 containing a drive circuit, for example.

Figure 1:
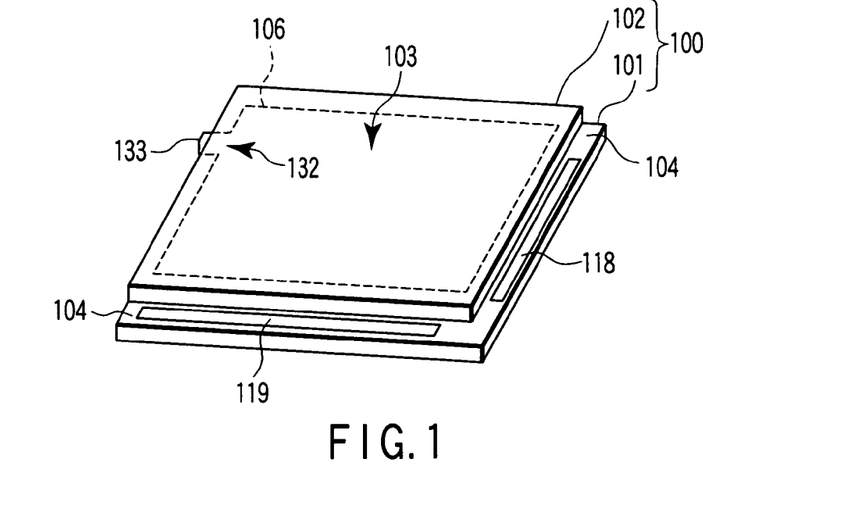
FIG. 1 is a view showing the appearance of a liquid crystal display panel, which is a liquid crystal display device according to a first embodiment of this invention.
Figure 2:
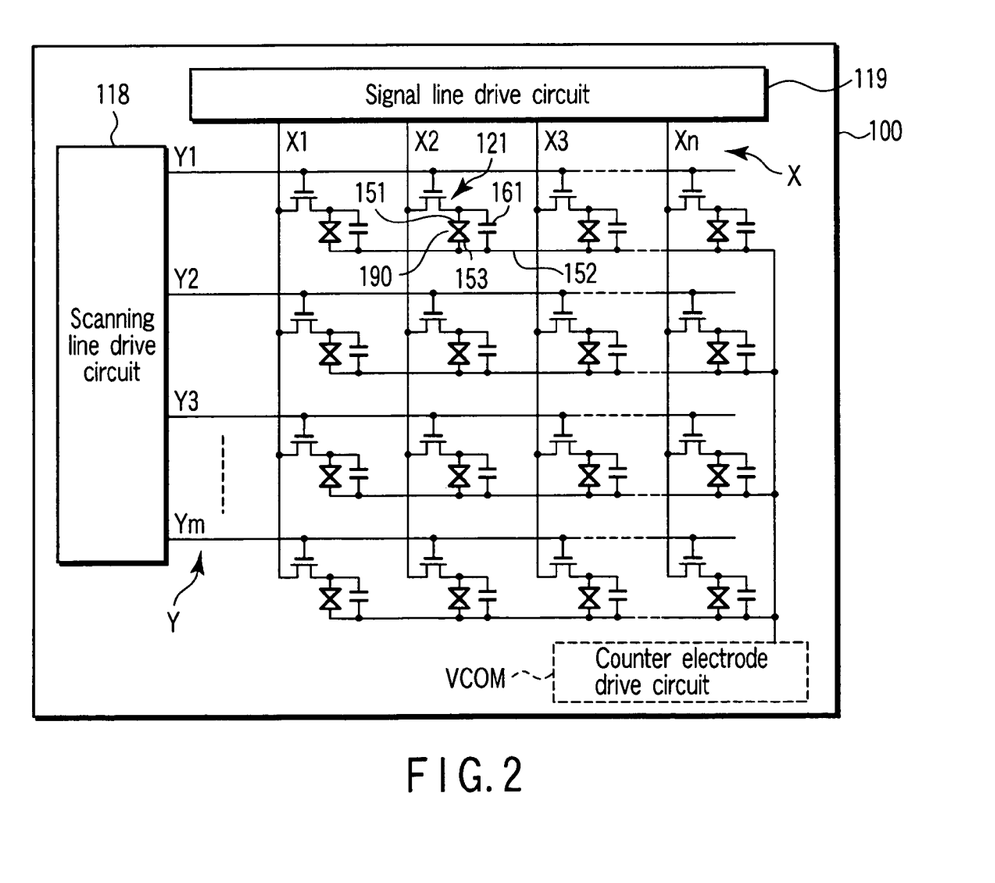
FIG. 2 is a diagram schematically showing the circuit configuration of the liquid crystal display panel shown in FIG. 1.
Figure 3:
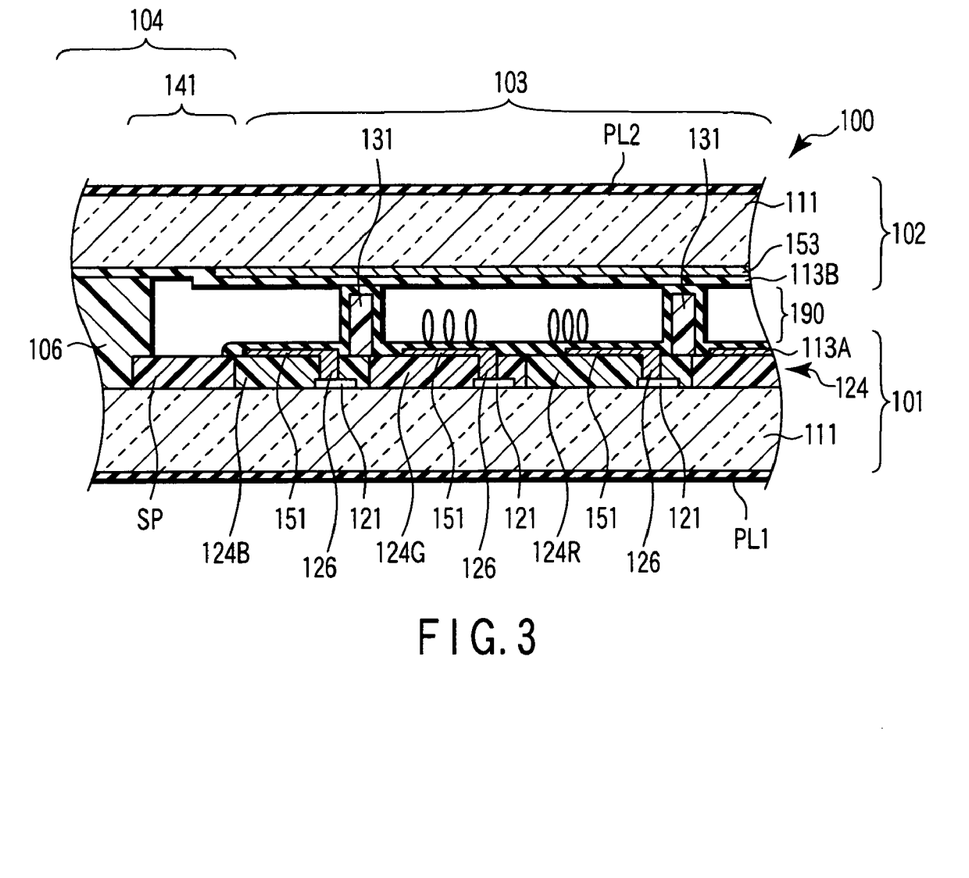
FIG. 3 is a cross sectional view schematically showing the cross section of the liquid crystal display panel shown in FIG. 1.
Figure 4:
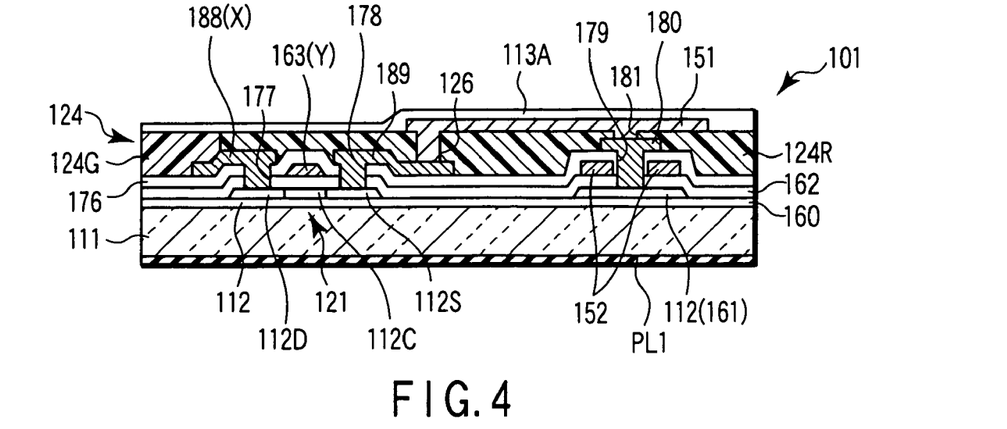
FIG. 4 is a cross sectional view showing the cross section of an array substrate of FIG. 3 in detail.

FIG. 1 shows the appearance of the liquid crystal display panel 100, FIG. 2 schematically shows the circuit configuration of the liquid crystal display panel 100 shown in FIG. 1, FIG. 3 schematically shows the cross section of the liquid crystal display panel 100 shown in FIG. 1, and FIG. 4 shows the cross sectional structure of an array substrate of FIG. 3 in detail.

As shown in FIG. 1, the liquid crystal display panel 100 includes an array substrate 101, a counter electrode 102 which faces the array substrate 101, and a liquid crystal layer 190 containing a liquid crystal composition held between the array substrate 101 and the counter electrode 102. The array substrate 101 and counter electrode 102 are bonded by use of a peripheral sealer 106 which is applied to surround the liquid crystal layer 190. In the liquid crystal display panel 100, a display area 103 for image display is provided inside the peripheral sealer 106, and a peripheral area 104 for receiving the drive circuit is provided around the display area 103. The peripheral area 104 includes a frame-form light shielding area 141 which surrounds the display area 103 inside the peripheral sealer 106 as shown in FIG. 3. The liquid crystal composition is applied through a liquid crystal inlet 132 which remains when the array substrate 101 and counter electrode 102 have been bonded and sealed after application of the composition.

As shown in FIG. 2, the array substrate 101 includes m×n pixel electrodes 151 arrayed in a matrix form in the display area 103, m scanning lines Y (Y1 to Yin) extending along the rows of the pixel electrodes 151, n signal lines X (X1 to Xn) extending along the columns of the pixel electrodes 151 and m×n thin film transistors (pixel TFTs) 121 disposed near the intersections of the scanning lines Y1 to Ym and the signal lines X1 to Xn as pixel switching elements for the m×n pixel electrodes 151. Further, it includes m storage capacitance lines 152 extending along the rows of the pixel electrodes 151. The scanning lines Y1 to Ym are substantially perpendicular to the signal lines X1 to Xn and substantially parallel to the storage capacitance lines 152. Each of the storage capacitance lines 152 is set to preset potential such as a common potential VCOM and capacitively coupled with n storage capacitance electrodes 161 which are set to the same potential as the pixel electrodes 151 of a corresponding row to configure storage capacitances.

Further, the array substrate 101 includes a scanning line drive circuit 118 for driving the scanning lines Y1 to Ym and a signal line drive circuit 119 for driving the signal lines X1 to Xn in the peripheral area 104. Each of the pixel TFTs 121 is connected to a corresponding one of the scanning lines Y and a corresponding one of the signal lines X. The pixel TFT is turned ON by a drive voltage from the scanning line Y and applies a signal voltage from the signal line X to a corresponding one of the pixel electrodes 151.

In the array substrate 101 shown in FIG. 3, the m×n pixel TFTs 121 are formed on a light transmission insulating substrate 111 such as a glass substrate, and covered with a color filter 124. The color filter 124 is configured by stripe-form red filter layers 124R, green filter layers 124G and blue filter layers 124B which are allocated for the pixel electrodes 51 of each column and repeatedly arranged in the row direction of the pixel electrodes 151. The m×n pixel electrodes 151 are made of a transparent conductive material such as ITO and formed on the color filter 124. Further, a plurality of column spacers 131 are formed on the color filter 124 between the pixel electrodes 151. The color filter 124, pixel electrodes 151 and column spacers 131 are entirely covered with an alignment film 113A. The alignment film 131A aligns liquid crystal molecules contained in the liquid crystal composition of the liquid crystal layer 190 in a direction substantially vertical to the array substrate 101. The array substrate 101 further includes a light shielding layer SP formed on part of the light transmission insulating film 111 which corresponds in position to the light shielding area 141 in the peripheral area 104. Further, in the array substrate 101, a polarizing plate PL1 is attached to the surface of the insulating substrate 111 which lies on the opposite side with respect to the liquid crystal layer 190.

In the counter substrate 102, a counter electrode 153 is formed on a light transmission insulating substrate 111 such as a glass plate and an alignment film 113B is formed to cover the counter electrode 153. The counter electrode 153 is made of a transparent conductive material such as ITO, and is arranged to face all the pixel electrodes 151 on the array substrate 101 side. The alignment film 113B aligns liquid crystal molecules contained in the liquid crystal composition of the liquid crystal layer 190 in a direction substantially vertical to the counter substrate 102. Further, in the counter substrate 102, a polarizing plate PL2 is attached to the surface of the insulating substrate 111 which lies on the opposite side with respect to the liquid crystal layer 190.

As shown in detail in FIG. 4, in the array substrate 101, a polysilicon semiconductor layer 112 is formed on an undercoating layer 160 on the surface of the insulating substrate 111, patterned for the pixel TFTs 121 and storage capacitance electrodes 161, and covered with a gate insulating film 162. The pixel TFT 121 includes a gate electrode 163 arranged above the semiconductor layer 112 with the gate insulating film 162 disposed therebetween, a channel region 112C formed of a portion of the semiconductor layer 112 which faces the gate electrode 163, and a drain region 112D and source region 112S formed by doping impurities into the semiconductor layer 112 on both sides of the channel region 112C. Further, it includes a drain electrode 188 connected to the drain region 112D and a source electrode 189 connected to the source region 112S. The storage capacitance electrode 161 is formed by doping impurities into the semiconductor layer 112 for the storage capacitance electrode 161. The pixel electrode 151 is connected to the storage capacitance electrode 161 via a contact electrode 180.

Wiring members such as the signal lines X, scanning lines Y and storage capacitance lines 152, the gate electrodes 163, drain electrodes 188 and source electrodes 189 of the pixel TFTs 121 and the contact electrodes 180 are formed of a low-resistance material such as aluminum or molybdenum-tungsten having a light shielding property. Specifically, the scanning lines Y, storage capacitance lines 152 and gate electrodes 163 are formed by patterning a conductive layer of, for example, molybdenum-tungsten formed to cover the gate insulating film 162. The gate electrode 163 is integrally formed with a corresponding one of the scanning lines Y, and a portion of the storage capacitance line 152 is formed to face the storage capacitance electrode 161 with the gate insulating film 162 disposed therebetween. The signal lines X, drain electrodes 188, source electrodes 189 and contact electrodes 180 are formed by patterning a conductive layer of, for example, aluminum formed on an interlayer insulating film 176 which covers the scanning lines Y, storage capacitance lines 152, gate electrodes 163 and gate insulating film 162. Each drain electrode 188 is formed in contact with a drain region 112D within a contact hole 177 which extends through the gate insulating film 162 and interlayer insulating film 176, and integrated with a corresponding one of the signal lines X. Each source electrode 189 is formed in contact with a source region 112S within a contact hole 178 which formed through the gate insulating film 162 and interlayer insulating film 176. Further, each contact electrode 180 is formed in contact with a corresponding one of the storage capacitance electrodes 161 within a contact hole 179 which extends through the gate insulating film 162 and interlayer insulating film 176.

The signal lines X, drain electrodes 188, source electrodes 189, contact electrodes 180 and interlayer insulating film 176 are covered with the color filter 124. Each pixel electrode 151 is formed in contact with a corresponding one of the source electrodes 189 of the pixel TFTs 121 within a contact hole 126 which extends through the color filter 124 and formed in contact with a corresponding one of the contact electrodes 180 within a through hole 181 which extends through the color filter 124.

The liquid crystal display device has a COA (Color filter On Array) structure in which the color filter 124 is formed on the array substrate 101 together with the array of the pixel TFTs 121 and pixel electrodes 151. The COA structure is preferable from the viewpoint of the manufacturing process and material cost because reliable alignment of the substrates can be made unnecessary in the bonding process, unlike the structure that the color filter 124 is formed on the counter substrate 102. When the liquid crystal display device is of a transmission type as described above, it is preferable to use transparent resin such as acrylic-family resin, epoxy-family resin or novolac-family resin as a material of the color filter 124 from the viewpoint of the transmittance and hue. If the liquid crystal display device is of a reflection type, black resin or the like other than the transparent resin such as acrylic-family resin, epoxy-family resin or novolac-family resin can be used as the material of the color filter 124 because no limitation is imposed on the color.

Figure 5:
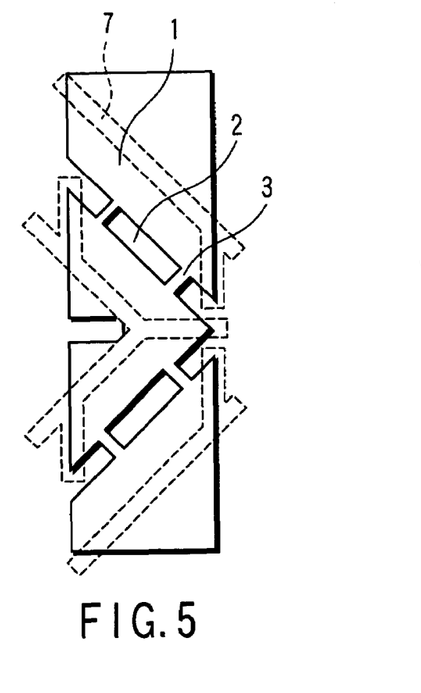
FIG. 5 is a view showing the plane structure of a pixel electrode shown in FIGS. 2 to 4.

FIG. 5 shows the plane structure of the pixel electrode 151. The pixel electrode 151 has a plurality of electrode segments 1 formed of a conductor, slits 2 which are void space separating or isolating the electrode segments 1 from one another, and a bridge-wiring member 3 which is formed across the slits 2 as wirings electrically interconnecting the electrode segments 1. On the counter electrode 153 of the counter substrate 102, a ridge-form insulating body 7 is formed as indicated by broken lines in FIG. 5 to distort the electric field applied to the liquid crystal layer 190, in association with the slit 2.

Figure 6:
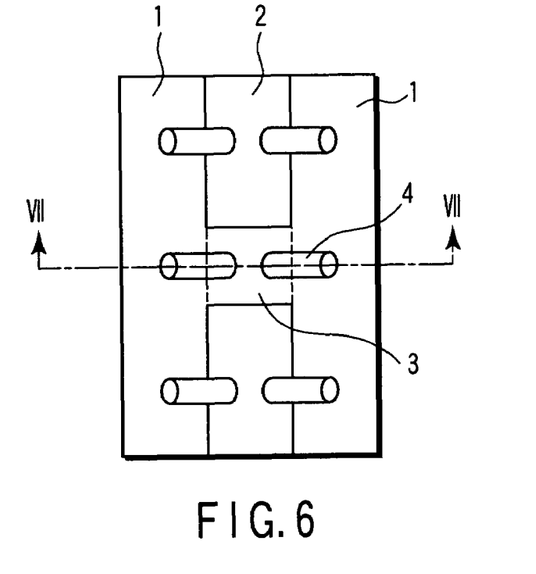
FIG. 6 is a view showing the plane structure of a part including a bridge-wiring member shown in FIG. 5.
Figure 7:
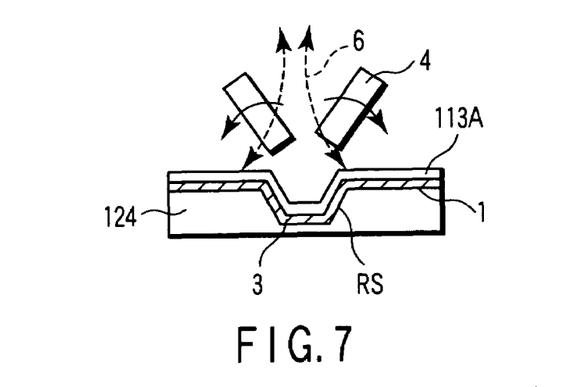
FIG. 7 is a cross sectional view taken along the VII-VII line of FIG. 6.

FIG. 6 shows the plane structure of a part including a bridge-wiring member 3 and FIG. 7 shows the cross sectional structure taken along the VII-VII line of FIG. 6. When a potential difference is applied between the pixel electrode 151 and the counter electrode 153, the liquid crystal molecules 4 are uniformly set to have tilt directions (directors) which differ with respect to the slit 2 serving as a boundary. As a result, minute domains between which the directors of the liquid crystal molecules 4 are different are obtained on both sides of the slit 2. That is, the slits 2 are formed in the conductor of the pixel electrode 151 as boundaries that divide a pixel area defined by an overlap of the pixel electrode 151 and counter electrode 153 into minute domains between which directors of the liquid crystal molecules are different. The bridge-wiring member 3 is integrated with the electrode segments 1, by forming a transparent conductive material layer of ITO and patterning the transparent conductive material layer. The color filter 124 has concave portions RS which are formed in the area corresponding to the bridge-wiring member 3 in the same process as the contact holes 181. Therefore, the bridge-wiring member 3 has a cross sectional structure shown in FIG. 7. The pixel electrode 151 is a transparent electrode formed of ITO, for example. The pixel TFT 121 can be configured as an active element having a multi-layered structure of a semiconductor layer of amorphous silicon (a-Si), polysilicon (poly-Si) or the like and a metal layer of Al, Mo, Cr, Cu, Ta or the like. The bridge-wiring member 3 can be formed of a conductive metal of Al, Mo, Cu or the like, as wirings interconnecting the electrode segments 1 which are obtained as a result of dividing the pixel electrode 151 by the slits 2. However, from the viewpoint of preventing an increase in the number of manufacturing steps, it is preferable that the bridge-wiring member 3 is formed of the same material as that of the electrode segments 1. Therefore, the bridge-wiring member 3 is integrally formed with the electrode segments 1 by patterning the transparent conductive material layer.

Further, the bridge-wiring member 3 is configured to make an electric field created in a part of the pixel area located on the bridge-wiring member 3 weaker than that created in the minute domains when the potential difference is applied between the pixel electrode 151 and counter electrode 153. Specifically, the array substrate 101 has a structure that makes the capacitance per unit area between the bridge-wiring member 3 and counter electrode 153 smaller than the capacitance per unit area between the electrode segment 1 of the pixel electrode 151 and counter electrode 153. Thus, the electric field on the bridge-wiring member 3 is weakened to set the tilt directions of the liquid crystal molecules 4 near the bridge-wiring member 3 equivalent to that of the liquid crystal molecules 4 near the slit 2. As described above, when the bridge-wiring member 3 is placed in the concave portion RS formed in the insulating material layer such as the color filter 124 that serves as the underlying layer of the pixel electrode 151, the bridge-wiring member 3 is made lower as a whole than the plane of the electrode segments 1. In this case, the distance between the bridge-wiring member 3 and the counter electrode 153 becomes longer than the distance between the electrode segments 1 of the pixel electrode 153 and the counter electrode 153, thereby weakening the electric field on the bridge-wiring member 3. Thus, the electric field on the bridge-wiring member 3 is set closer to the electric field on the slit 2, so that the liquid crystal molecules 4 near the bridge-wiring member 3 can be set to the same tilt directions as those of the liquid crystal molecules 4 near the slit 2. Specifically, the bridge-wiring member 3 is formed with a taper angle of 45° and a depth of at least 0.5 µm, preferably approximately 1 to 2 µm in practice.

In the present embodiment, as shown in FIG. 7, the bridge-wiring member 3 has a structure dented with respect to the pixel electrode 151. When an electric field is applied to the liquid crystal layer 190 from the pixel electrode 151 and counter electrode 153, the alignment of the liquid crystal molecules 4 is changed toward that parallel to the substrate surfaces of the array substrate 101 and counter substrate 102. Since the bridge-wiring member 3 creates the electric field distorted in the same directions as the electric field on the slit 2, only the desired original alignment state is obtained near the bridge-wiring member 3 as shown in FIG. 6. Even if the alignment of the liquid crystal molecules 4 is made irregular due to a mechanical shock given in this state, the original alignment state is rapidly restored since the electric field is controlled to the same distortion as the electric field on the slit 2. In practice, display irregularity was observed after a load of 400 g was applied to the front surface (area 20 mm$^2$) of the liquid crystal display device for five seconds and the display irregularity was not visually recognized after 60 seconds.

Figure 8:
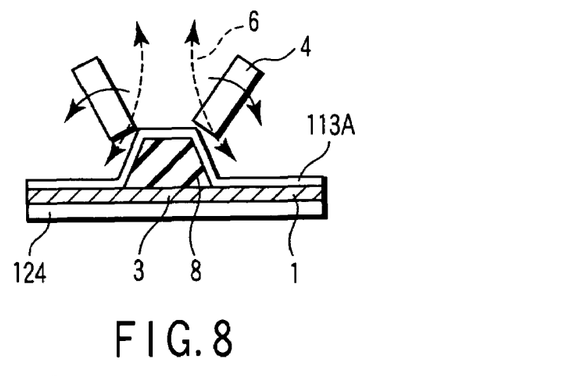
FIG. 8 is a view showing the cross sectional structure of a part including the bridge-wiring member taken along the VII-VII line of FIG. 6, for illustrating a liquid crystal display panel which is a liquid crystal display device according to a second embodiment of this invention.

Next, an active matrix type liquid crystal display device according to a second embodiment of this invention is explained. The liquid crystal display device is configured in the same manner as in the first embodiment except that the structure near the bridge-wiring member 3 is configured as shown in FIG. 8. Therefore, the similar portions as those of the first embodiment are denoted by the same reference symbols and the explanation thereof is omitted.

In the liquid crystal display device, an insulating body 8 is disposed adjacent to a liquid crystal layer 190 on the bridge-wiring member 3. The above arrangement is made to set the electric field on the bridge-wiring member 3 closer to the electric field on the slit 2, so that the liquid crystal molecules 4 near the bridge-wiring member 3 can be set to the same tilt directions as those of the liquid crystal molecules 4 near the slit 2. The above arrangement utilizes the electric field shielding property of the insulating body 8. However, in this case, the requirements relating to the a.c. and d.c. characteristics of the liquid crystal display device must be satisfied. From the viewpoint of the d.c. characteristic, the driving condition of the pixel TFT 121 is provided for the specific resistance ρ of the insulating body 8. That is, the specific resistance ρ of the insulating body 8 is required to be the same as or higher than the specific resistance of the liquid crystal layer 190 which is approximately $10^{13}$Ωcm or more. The specific resistance ρ of the insulating body 8 is preferably set to $10^{12}$Ωcm or more and is more preferably set to $10^{13}$Ωcm or more. Further, from the viewpoint of the a.c. characteristic, it is required to use the insulating body 8 so as to adequately weaken the electric field in the liquid crystal layer 190. For this purpose, it is preferable to set the capacitance determined by the dielectric constant, thickness and cross sectional area of the insulating body 8 to a value equal to or smaller than approximately ten times the capacitance depending on the dielectric constant, thickness and cross sectional area of the liquid crystal layer 190 on the insulating body 8. If the dielectric constant ε of the insulating body 8 is set to approximately 3, it becomes approximately ⅓ of the dielectric constant of the liquid crystal layer 190 which is approximately 10. If the thickness of the insulating body 8 is approximately 0.1 µm, it becomes approximately ⅟35 of the thickness of the liquid crystal layer 190 which is approximately 3.5 µm. Therefore, the capacitance depending on the insulating body 8 is approximately ten times the capacitance depending on the liquid crystal layer 190 on the insulating body 8 and can give an influence to the electric field distribution in the liquid crystal layer 190. That is, the insulating body 8 is more preferable as the dielectric constant thereof is smaller than the dielectric constant of the liquid crystal layer 190 and the thickness thereof is larger. It is sufficient if the insulating body 8 has a dielectric constant of approximately 3 and a thickness of 0.1 µm or more. However, the more preferable operation can be attained by utilizing the slant shape of the insulating body 8 by setting the thickness of the insulating body 8 to approximately 1 to 2 µm. As a concrete material of the insulating body 8, acrylic-family resin, epoxy-family resin or novolac-family resin can be used. Particularly, it is preferable to use a transparent resin material in the design in which much attention is paid to the transmittance of the liquid crystal layer. Further, the above resins can be combined according to the application.

In the present embodiment, as shown in FIG. 8, the insulating body 8 is disposed adjacent to the liquid crystal layer 190 on the bridge-wiring member 3.

When an electric field is applied to the liquid crystal layer 190 from the pixel electrode 151 and counter electrode 153, the alignment of the liquid crystal molecules 4 is changed toward that parallel to the substrate surfaces of the array substrate 101 and counter substrate 102. Since the bridge-wiring member 3 creates the electric field distorted in the same directions as the electric field on the slit 2, only the desired original alignment state is obtained near the bridge-wiring member 3 as shown in FIG. 6. Even if the alignment of the liquid crystal molecules 4 is made irregular due to a mechanical shock given in this state, the original alignment state is rapidly restored since the electric field is controlled to the same distortion as the electric field on the slit 2. In practice, display irregularity was observed after a load of 400 g was applied to the front surface (area 20 mm$^2$) of the liquid crystal display device for five seconds and the display irregularity was not visually recognized after 60 seconds.

Figure 9:
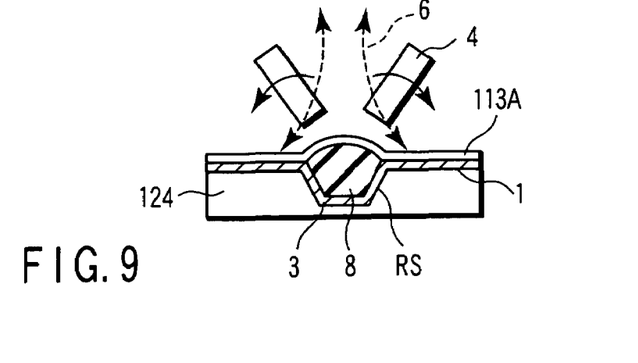
FIG. 9 is a view showing the cross sectional structure of a part including the bridge-wiring member taken along the VII-VII line of FIG. 6, for illustrating a liquid crystal display panel which is a liquid crystal display device according to a third embodiment of this invention.

Next, an active matrix type liquid crystal display device according to a third embodiment of this invention is explained. The liquid crystal display device is configured in the same manner as in the second embodiment except that the structure near the bridge-wiring member 3 is configured as shown in FIG. 9. Therefore, the similar portions as those of the second embodiment are denoted by the same reference symbols and the explanation thereof is omitted.

In the liquid crystal display device, a color filter 124 has concave portions RS which are formed in the area corresponding to the bridge-wiring member 3 in the same process as the contact holes 181. The bridge-wiring member 3 is integrated with the electrode segments 1, by forming a transparent conductive material layer of ITO and patterning the transparent conductive material layer. Further, an insulating body 8 is formed adjacent to a liquid crystal layer 190 on the bridge-wiring member 3. The insulating body 8 can be obtained by applying a column spacer material on the bridge-wiring member 3 in the same process as the column spacers 131. Thus, the bridge-wiring member 3 has a cross section as shown in FIG. 9 and is covered with the insulating body 8.

In the present embodiment, as shown in FIG. 9, the insulating body 8 is formed adjacent to the liquid crystal layer 190 on the bridge-wiring member 3 of a structure dented with respect to a pixel electrode 151 in the same manner as in the first embodiment. When the electric field is applied to the liquid crystal layer 190 from the pixel electrode 151 and counter electrode 153, the alignment of the liquid crystal molecules 4 is changed toward that parallel to the substrate surfaces of the array substrate 101 and counter substrate 102. Since the bridge-wiring member 3 creates the electric field distorted in the same directions as the electric field on the slit 2, only the desired original alignment state is obtained near the bridge-wiring member 3 as shown in FIG. 6. Even if the alignment of the liquid crystal molecules 4 is made irregular due to a mechanical shock given in this state, the original alignment state is rapidly restored since the electric field is controlled to the same distortion as the electric field on the slit 2. In practice, display irregularity was observed after a load of 400 g was applied to the front surface (area 20 mm$^2$) of the liquid crystal display device for five seconds and the display irregularity was not visually recognized after 60 seconds.

As a comparison example 1, the liquid crystal display device with the structure shown in FIG. 14 was manufactured in the same manufacturing process as that in the above embodiment without forming the bridge-wiring member 3 which has the structure dented with respect to the pixel electrode 151 or forming the insulating body 8 which is disposed adjacent to the liquid crystal layer 190 on the bridge-wiring member 3. When an electric field is applied to the liquid crystal layer 190 from the pixel electrode 151 and counter electrode 153, the alignment of the liquid crystal molecules 4 is changed toward that parallel to the substrate surfaces of the array substrate 101 and counter substrate 102. However, even if the desired original alignment state is obtained near the bridge-wiring member 3 as shown in FIG. 6, the original alignment state is not rapidly restored after the alignment of the liquid crystal molecules 4 is made irregular upon application of a mechanical shock, since the electric field is not controlled to the same distortion as the electric field on the slit 2. In practice, display irregularity was observed after a load of 400 g was applied to the front surface (area 20 mm$^2$) of the liquid crystal display device for five seconds and the display irregularity was not visually recognized after 180 seconds.

Figure 10:
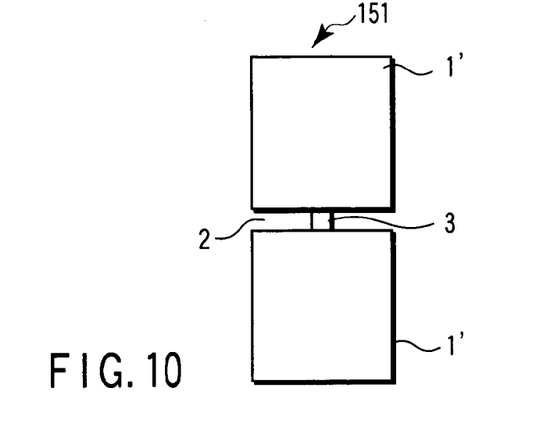
FIG. 10 is a view showing a first modification of the pixel electrode shown in FIG. 5.

FIG. 10 shows a first modification of the pixel electrode 151 shown in FIG. 5. The first modification is applied in a case where the liquid crystal display device is set in a CPA (Continuous Pinwheel Alignment) mode. Each pixel is divided into a plurality of sub-pixels and the alignment of the liquid crystal molecules 4 are set in rotation symmetry about the midpoint of the sub-pixel. Specifically, the pixel electrode 151 is divided into sub-pixel electrode segments 1' of a square form by the slit 2, and the bridge-wiring member 3 is formed as wirings which electrically connects the sub-pixel electrode segments 1' to each other to set them to the same potential without requiring a redundant wiring space. In the case of the present modification, the directors of the liquid crystal molecules 4 in the sub-pixel are not set in one direction. That is, the liquid crystal molecules 4 uniformly fall in various directions, but the falling patterns are substantially the same when they are compared with one another in a plurality of sub-pixels. In the present modification, a region for the sub-pixel is called a minute domain and wirings for connecting the sub-pixel electrode segments 1' to each other are called a bridge-wiring member.

The bridge-wiring member 3 has a structure dented with respect to the pixel electrode 151 by forming a concave portion RS in the color filter 124 like the case of FIG. 7. When an electric field is applied to the liquid crystal layer 190 from the pixel electrode 151 and counter electrode 153, the alignment of the liquid crystal molecules 4 is changed toward that parallel to the substrate surfaces of the array substrate 101 and counter substrate 102. Since the bridge-wiring member 3 creates the electric field distorted in the same directions as the electric field on the slit 2 adjacent thereto, only the desired original alignment state is obtained near the bridge-wiring member 3 as shown in FIG. 6. Even if the alignment of the liquid crystal molecules 4 is made irregular due to a mechanical shock given in this state, the original alignment state is rapidly restored since the electric field is controlled to the same distortion as the electric field on the slit 2. In practice, display irregularity was observed after a load of 400 g was applied to the front surface (area 20 mm$^2$) of the liquid crystal display device for five seconds and the display irregularity was not visually recognized after 90 seconds.

Figure 11:
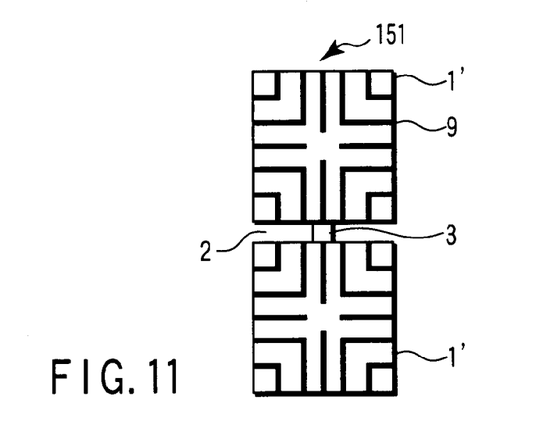
FIG. 11 is a view showing a second modification of the pixel electrode shown in FIG. 5.

FIG. 11 shows a second modification of the pixel electrode 151 shown in FIG. 5. The second modification is applied in a case where the liquid crystal display device is set in a CPA (Continuous Pinwheel Alignment) mode. Each pixel is divided into a plurality of sub-pixels, and the liquid crystal molecules 4 are set in rotation symmetry about the midpoint of the sub-pixel. Specifically, the pixel electrode 151 is divided into sub-pixel electrode segments 1' of a square form by the slit 2 and the bridge-wiring member 3 is formed as wirings for electrically connecting the sub-pixel electrode segments 1' to each other to set them to the same potential without requiring a redundant wiring space. Further, a plurality of grooves 9 are provided for each sub-pixel electrode segment 1' in a pattern shown in FIG. 11 so as to optimize the liquid crystal alignment. The grooves 9 can be obtained by forming groove portions in the color filter 124.

The bridge-wiring member 3 has a structure dented with respect to the pixel electrode 151 by forming a concave portion RS in the color filter 124 like the case of FIG. 7. When an electric field is applied to the liquid crystal layer 190 from the pixel electrode 151 and counter electrode 153, the alignment of the liquid crystal molecules 4 is changed toward that parallel to the substrate surfaces of the array substrate 101 and counter substrate 102. Since the bridge-wiring member 3 creates the electric field distorted in the same directions as the electric field on the slit 2 adjacent thereto, only the desired original alignment state is obtained near the bridge-wiring member 3 as shown in FIG. 6. Even if the alignment of the liquid crystal molecules 4 is made irregular due to a mechanical shock given in this state, the original alignment state is rapidly restored since the electric field is controlled to the same distortion as the electric field on the slit 2. In practice, display irregularity was observed after a load of 400 g was applied to the front surface (area 20 mm$^2$) of the liquid crystal display device for five seconds and the display irregularity was not visually recognized after 60 seconds.

Figure 12:
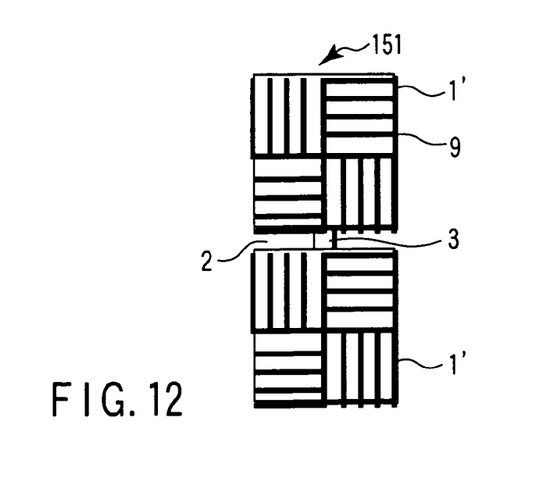
FIG. 12 is a view showing a third modification of the pixel electrode shown in FIG. 5.

FIG. 12 shows a third modification of the pixel electrode 151 shown in FIG. 5. The third modification is applied in a case where the liquid crystal display device is set in a CPA (Continuous Pinwheel Alignment) mode. Each pixel is divided into a plurality of sub-pixels, and the liquid crystal molecules 4 are set in rotation symmetry about the midpoint of the sub-pixel. Specifically, the pixel electrode 151 is divided into sub-pixel electrode segments 1' of a square form by the slit 2 and the bridge-wiring member 3 is formed as wirings for electrically connecting the sub-pixel electrode segments 1' to each other to set them to the same potential without requiring a redundant wiring space. Further, a plurality of grooves 9 are provided for each sub-pixel electrode segment 1' in a pattern shown in FIG. 12 so as to optimize the liquid crystal alignment.

An insulating body used as a dielectric body in the same manner as in the case of FIG. 8 is arranged adjacent to a liquid crystal layer 190 on the bridge-wiring member 3. The dielectric constant of the insulating body 8 is smaller than that of the liquid crystal layer 190. The insulating body 8 can be obtained by applying a column spacer material on the bridge-wiring member 3 in the same process as the column spacers 131. When an electric field is applied to the liquid crystal layer 190 from the pixel electrode 151 and counter electrode 153, the alignment of the liquid crystal molecules 4 is changed toward that parallel to the substrate surfaces of the array substrate 101 and counter substrate 102. Since the bridge-wiring member 3 creates the electric field distorted in the same directions as the electric field on the slit 2 adjacent thereto, only the desired original alignment state is obtained near the bridge-wiring member 3 as shown in FIG. 6. Even if the alignment of the liquid crystal molecules 4 is made irregular due to a mechanical shock given in this state, the original alignment state is rapidly restored since the electric field is controlled to the same distortion as the electric field on the slit 2. In practice, display irregularity was observed after a load of 400 g was applied to the front surface (area 20 mm$^2$) of the liquid crystal display device for five seconds and the display irregularity was not visually recognized after 45 seconds.

As a comparison example 2, the liquid crystal display device having the pixel electrode of FIG. 5 was manufactured in the same manufacturing process as that in the above embodiment without forming the bridge-wiring member 3 which has the structure dented with respect to the pixel electrode 151 or forming the insulating body 8 which is disposed adjacent to the liquid crystal layer 190 on the bridge-wiring member 3. When an electric field is applied to the liquid crystal layer 190 from the pixel electrode 151 and counter electrode 153, the alignment of the liquid crystal molecules 4 is changed toward that parallel to the substrate surfaces of the array substrate 101 and counter substrate 102. However, even if the desired original alignment state is obtained near the bridge-wiring member 3 as shown in FIG. 6, the original alignment state is not rapidly restored after the alignment of the liquid crystal molecules 4 is made irregular upon application of a mechanical shock, since the electric field is not controlled to the same distortion as the electric field on the slit 2. In practice, display irregularity was observed after a load of 400 g was applied to the front surface (area 20 mm$^2$) of the liquid crystal display device for five seconds and the display irregularity was not visually recognized after 300 seconds.

That is, it is confirmed that the liquid crystal display devices of the above embodiments and modifications can attain high display quality in comparison with the liquid crystal display devices of the comparison examples 1 and 2 utilizing the prior art technique.

This invention is not limited to the above embodiments and can be variously modified without departing from the technical scope thereof.

In the above embodiments, the insulating body 7 is formed on the counter electrode 153 of the counter substrate 102, but the insulating body 7 can be replaced by a slit 2 formed as a void space of the counter electrode 153.

Further, in the above embodiments, the alignment films 113A and 113B are disposed on the pixel electrodes 151 and counter electrode 153, but various insulating films can be formed on the above electrodes according to applications depending on the structure.

In this case, as the insulating film, for example, an inorganic-series thin film of $SiO_2$, SiN or $Al_2O_3$ or an organic-series thin film of polyimide, photoresist resin or high polymer liquid crystal can be used. If the insulating film is formed of an inorganic-series thin film, it can be formed by use of a deposition method, sputtering method, CVD (Chemical Vapor Deposition) method or solution coating method. Further, if the insulating film is formed of an organic-series thin film, it can be formed by coating a solution in which an organic material is dissolved or a precursor solution thereof by use of a spinner coating method, screen print coating method or roll coating method and curing the same in a preset curing condition (heating, application of light or the like) or by use of a deposition method, sputtering method, CVD method or LB (Langumuir-Blodgett) method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a first substrate having a first electrode formed of a conductor;
   a second substrate having a second electrode arranged to face said first electrode; and
   a liquid crystal layer held between said first and second substrates and containing liquid crystal molecules which are set substantially in a vertical alignment with respect to said first and second substrates in a state where no potential difference exists between said first and second electrodes;
   wherein said first electrode comprises a pixel electrode configured to apply a voltage to the liquid crystal molecules, said first electrode has a void space located in said conductor to divide the first electrode into segments and thereby forming boundaries that divide a pixel area defined by an overlap of said first and second electrodes into minute domains between which different directors of said liquid crystal molecules are obtained when a potential difference is applied between said first and second electrodes, and a bridge-wiring member interconnecting adjacent parts of said first conductor across said void space to connect said segments together, and said bridge-wiring member is configured to make an electric field created in a part of said pixel area located above said bridge-wiring member weaker than that created in said minute domains above the segments of the pixel electrode that are displaced from the bridge wiring member when the potential difference is applied between said first and second electrodes.

2. The liquid crystal display device according to claim 1, wherein capacitance per unit area between said first and second electrodes is smaller in a range corresponding to part of said pixel area located on said bridge-wiring member than in a range corresponding to said minute domain.

3. The liquid crystal device according to claim 2, wherein a dielectric body having a dielectric constant smaller than that of the said liquid crystal layer is disposed on a part of the said pixel area which is located on said bridge-wiring member and said dielectric body contacts said bridge-wiring member.

4. The liquid crystal display device according to claim 3, wherein said dielectric body has a dielectric constant of not larger than 3 and a thickness of not smaller than 0.1 μm.

5. The liquid crystal display device according to claim 3, which further comprises spacers provided between said first and second substrates to maintain a gap between said first and second substrates and in which said dielectric body is formed of the same material as that of said spacer.

6. The liquid crystal display device according to claim 2, wherein a distance between said first and second electrodes is longer in a range corresponding to part of said pixel area located on said bridge-wiring member than in a range corresponding to said minute domain.

7. The liquid crystal display device according to claim 6, wherein the distance between said first and second electrodes is longer in a range corresponding to part of said pixel area located on said bridge-wiring member than in a range corresponding to said minute domain by 0.5 to 2.0 μm.

8. The liquid crystal device according to claim 6, wherein said bridge-wiring member of said first electrode connects across the void space dividing the pixel area of the first electrode and said bridge-wiring member is formed on a concave portion located in said first substrate under the void space.

9. The liquid crystal display device according to claim 8, wherein a dielectric body is formed on said bridge-wiring member.

10. The liquid crystal display device according to claim 8, wherein said first electrode is formed on a color filter located on said first substrate, and said concave portion is part of said color filter.

* * * * *